United States Patent
Fechner et al.

(10) Patent No.: US 7,598,191 B2
(45) Date of Patent: *Oct. 6, 2009

(54) UV-ABSORBING BOROSILICATE GLASS FOR A GAS DISCHARGE LAMP AND PROCESS FOR MANUFACTURING SAME

(75) Inventors: Joerg Fechner, Mainz (DE); Franz Ott, Mitterteich (DE); Brigitte Hueber, Schwandorf (DE)

(73) Assignee: Schott AG, Mainz (DE)

( * ) Notice: Subject to any disclaimer, the term of this patent is extended or adjusted under 35 U.S.C. 154(b) by 519 days.

This patent is subject to a terminal disclaimer.

(21) Appl. No.: 11/178,793

(22) Filed: Jul. 11, 2005

(65) Prior Publication Data

US 2006/0009343 A1    Jan. 12, 2006

(30) Foreign Application Priority Data

Jul. 12, 2004    (DE) .................. 10 2004 033 652

(51) Int. Cl.
*C03C 3/089* (2006.01)
*C03C 3/091* (2006.01)

(52) U.S. Cl. ............... 501/64; 501/65; 501/66; 313/493; 313/636

(58) Field of Classification Search .............. 501/64, 501/65, 66; 313/493, 636
See application file for complete search history.

(56) References Cited

U.S. PATENT DOCUMENTS

| | | | |
|---|---|---|---|
| 4,565,791 A | 1/1986 | Boudot et al. | |
| 5,747,399 A | 5/1998 | Kosokabe et al. | |
| 6,204,212 B1 | 3/2001 | Kunert et al. | |
| 7,375,043 B2 * | 5/2008 | Fechner et al. | 501/65 |
| 2004/0266603 A1 * | 12/2004 | Fechner et al. | 501/66 |
| 2005/0037911 A1 * | 2/2005 | Fechner et al. | 501/66 |
| 2006/0006786 A1 * | 1/2006 | Fechner et al. | 313/493 |
| 2006/0010917 A1 * | 1/2006 | Fechner et al. | 65/101 |
| 2008/0254301 A1 * | 10/2008 | Fechner et al. | 428/432 |

FOREIGN PATENT DOCUMENTS

| | | |
|---|---|---|
| DE | 198 42 942 A1 | 4/2000 |
| EP | 0 999 574 A1 | 5/2000 |

* cited by examiner

*Primary Examiner*—Karl E Group
(74) *Attorney, Agent, or Firm*—Michael J. Striker

(57) ABSTRACT

Glass for gas discharge tubes, which are used in fluorescent lamps, EEFL lamps, LCD displays, computer monitors, telephone displays and TFT displays, and a process for making it are described. The glass contains, in % by weight based on oxide content: $SiO_2$, 60-75; $B_2O_3$, >25-35; $Al_2O_3$, 0-10; $Li_2O$, 0-10; $Na_2O$, 0-20; $K_2O$, 0-20; MgO, 0-8; CaO, 0-20; SrO, 0-5; BaO, 0-5; ZnO, 0-3; $ZrO_2$, 0-5; $TiO_2$, 0-10; $Fe_2O_3$, 0-0.5; $CeO_2$ 0-0.5; $MnO_2$, 0-1.0; $Nd_2O_3$, 0-1.0; $WO_3$, 0-2; $Bi_2O_3$, 0-5; $MoO_3$, 0-5; $As_2O_3$, 0-1; $Sb_2O_3$, 0-1; $SO_4^{2-}$, 0-2; $Cl^-$, 0-2 and $F^-$, 0-2, wherein $\Sigma Li_2O+Na_2O+K_2O=0\text{-}25\%$ by weight; $\Sigma MgO+CaO+SrO+BaO=0\text{-}20$; $\Sigma Fe_2O_3+CeO_2+TiO_2+PbO+As_2O_3+Sb_2O_3$ is at least 0-10; and $\Sigma PdO+PtO_3+PtO_2+PtO+RhO_2+Rh_2O_3+IrO_2+Ir_2O_3$ is from 0.00001-0.1.

28 Claims, 3 Drawing Sheets

UV-ABSORBING BOROSILICATE GLASS FOR A GAS DISCHARGE LAMP AND PROCESS FOR MANUFACTURING SAME

BACKGROUND OF THE INVENTION

1. Field of the Invention

The present invention relates to a UV-radiation-absorbing, especially solarization-stable, borosilicate glass for a gas discharge lamp, which is characterized by only a slight absorption in the visible range. It also relates to a process for making from a refined glass melt and to a glass discharge lamp made with this UV-radiation-absorbing borosilicate glass.

2. Related Art

Glasses for making gas discharge tubes, like those used in fluorescent lights, are known. These glasses should have a great resistance to solarization as well as great UV absorption properties. Also they should be resistant to the aggressive or reactive conditions existing in these types of glass discharge tubes.

Fluorescent lights are used as light sources, especially for making liquid crystal display devices (LCD) and display devices illuminated from the rear, the so-called backlight displays. Fluorescent lights for these applications have very small dimensions and correspondingly the lamp glass only has an extremely small thickness. It has been shown that the absorption in the visible range under 1000 nm is definitely noticeable in spite of the small thickness and is disadvantageous especially for high quality electronic display apparatus, such as computer screens, particularly for laptops or also for mobile telephones.

Furthermore the transmission of or transparency to radiation, especially visible light, down to wavelengths below 400 nm, especially below 380 nm, should be kept comparatively constant and then rapidly reduced. Gas discharge lamps, especially fluorescent lamps, emit a strong fraction of their radiation in the UV range, which has a damaging effect on surrounding components, such as polymers and other plastic materials, so that they become brittle with increasing time, which can result in the failure of the entire product. The mercury line at 313 nm is an especially damaging emission line. Thus one goal is to make glass of this type, which absorbs this emission line as completely as possible.

Fluorescent lamp glasses for the above-described application, which absorb UV radiation to the desired extent, are known from U.S. Pat. No. 5,747,399. However it has been shown that this sort of glass is characterized by a strong discoloration in the visible range and strong solarization. Frequently a yellow brown discoloration is produced already during melting of the raw materials.

A zirconium oxide-containing and lithium oxide-containing borosilicate glass of high resistance is known from DE-A 198 42 942, which is especially suitable for use as solder or fusing glass with Fe—Co—Ni alloys.

One such glass can also contain color-imparting ingredients, such as $Fe_2O_3$, $Cr_2O_3$, CoO and $TiO_2$.

U.S. Pat. No. 4,565,791 describes a glass for ophthalmologic applications, which has special refractive indices and Abbé numbers and densities suitable for that purpose. A glass of this sort has a UV-absorption limit between 310 and 335 nm and contains $TiO_2$ as UV absorber. It is explicitly stated that refining with chloride is necessary in many cases in order to make this glass, since $As_2O_3$ and $Sb_2O_3$ refining is insufficient. Finally the reference likewise states that although the glass of this type is extremely thin a combination of $Fe_2O_3$ and $TiO_2$ leads to discoloration of the glass, which is the reason that quartz material with an iron content of less than 100 ppm should be exclusively used.

Also borosilicate glasses with a small amount of $B_2O_3$ are known. For example, this sort of zirconium oxide-containing and lithium oxide-containing borosilicate is described in DE-A 198 42 942. This glass has a high acid and alkali resistance and resistance to hydrolysis and is especially suitable for sealing or soldering with Fe—Co—Ni alloys. This sort of glass can contain color-imparting ingredients, such as $Fe_2O_3$, $Ce_2O_3$, Co and TiO. However it is known that the boron content in this sort of glass leads to reduced resistance to chemical attack. Up to now glass with a high boron content, i.e. of more than 25% by weight, has not been considered for use as glass for gas discharge tubes, because it has an extremely poor chemical resistance, and, based on that, the fluorescent layer in these lamps would react with the substrate glass under the reactive conditions existing in the glass discharge tubes.

SUMMARY OF THE INVENTION

It is an object of the present invention to provide an improved glass, which can be used in gas discharge tubes, especially fluorescent lamps.

It is another object of the present invention to provide a glass of this sort, which has a high UV absorption and at the same time an especially good transparency for wavelengths in the visible range. That means that the transmission from maximum absorption to maximum transmission occurs rapidly or is steep, so that the spacing between the maximum absorption and maximum transmission is extremely small, i.e. the so-called UV-cutoff, is as steep as possible.

It is an additional object of the present invention to provide glass, which can be used to make a gas discharge tube with an external electrode and especially as a substrate glass for so-called backlight displays.

These objects and others, which will be made more apparent hereinafter, are attained by features described in the appended claims.

According to one aspect of the present invention the gas discharge lamp is made with a UV-absorbing borosilicate glass, which has a composition in % by weight on an oxide basis of:

| | |
|---|---|
| $SiO_2$ | 60-75 |
| $B_2O_3$ | >25-35 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-3 |
| $ZrO_2$ | 0-5 |
| $TiO_2$ | 0-10 |
| $Fe_2O_3$ | 0-0.5 |
| $CeO_2$ | 0-0.5 |
| $MnO_2$ | 0-1.0 |
| $Nd_2O_3$ | 0-1.0 |
| $WO_3$ | 0-2 |
| $Bi_2O_3$ | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ | 0-2 |
| $F^-$ | 0-2; | wherein a sum total amount of $Li_2O+Na_2O+K_2O$ is 0 to 25% by weight; a sum total amount of $MgO+CaO+SrO+BaO$ is 0 to 20% by weight; a sum total amount of $Fe_2O_3+CeO_2+TiO_2+PbO+As_2O_3+Sb_2O_3$ is at least 0 to 10% by weight; and a sum total amount of $PdO+PtO_3+PtO_2+PtO+RhO_2+Rh_2O_3+IrO_2+Ir_2O_3$ is from 0.00001-0.1% by weight.

According to another aspect of the present invention the process for making a UV-absorbing glass, especially for a fluorescent lamp, comprises preparation of a glass melt, which has a composition in % by weight on an oxide basis of:

| | |
|---|---|
| $SiO_2$ | 60-75 |
| $B_2O_3$ | >25-35 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-3 |
| $ZrO_2$ | 0-5 |
| $TiO_2$ | 0-10 |
| $Fe_2O_3$ | 0-0.5 |
| $CeO_2$ | 0-0.5 |
| $MnO_2$ | 0-1.0 |
| $Nd_2O_3$ | 0-1.0 |
| $WO_3$ | 0-2 |
| $Bi_2O_3$ | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ | 0-2 |
| $F^-$ | 0-2; | wherein a sum total amount of $Li_2O+Na_2O+K_2O$ is 0 to 25% by weight; a sum total amount of $MgO+CaO+SrO+BaO$ is 0 to 20% by weight; a sum total amount of $Fe_2O_3+CeO_2+TiO_2+PbO+As_2O_3+Sb_2O_3$ is at least 0 to 10% by weight; and a sum total amount of $PdO+PtO_3+PtO_2+PtO+RhO_2+Rh_2O_3+IrO_2+Ir_{203}$ is from 0.00001-0.1% by weight.

A further aspect of the invention is the UV-absorbing borosilicate glass with the above-described composition.

It was surprisingly found that borosilicate glass with high boron content was suitable for use as substrate glass in gas discharge tubes. The expected reaction between the glass and a fluorescent coating provided inside the tubes does not occur, at least under the conditions during fluorescent light operation and the glass is sufficiently corrosion resistant during operation. The invention is thus based on the surprising knowledge that a silicate glass with high boron content is suitable for these applications.

The base glass according to the invention usually contains at least 60% by weight $SiO_2$, but at least 61% by weight and especially at least 63% by weight are preferred. The most preferable minimum amount of $SiO_2$ is 65% by weight. The maximum amount of $SiO_2$ in the base glass according to the invention is 75% by weight, especially 73% by weight, but 72% by weight and especially 70% by weight $SiO_2$ are particularly preferred. $B_2O_3$ is contained in the base glass in an amount of more than 25% by weight, preferably more than 26% by weight and especially at least 27% by weight. However an amount of at least 28% by weight or at least 29% by weight is especially preferred. The maximum amount of $B_2O_3$ amounts to at most 35% by weight, but a maximum amount of 32% by weight, especially 30% by weight, is preferred.

$Al_2O_3$ is contained in the glass according to the invention in an amount of 0 to 10% by weight. A minimum amount of 0.5% by weight or 1, especially 2, % by weight, is preferred. The maximum amount of $Al_2O_3$ in the base glass is usually 5% by weight, preferably 3% by weight. The individual alkali oxides, $Li_2O$, $Na_2O$ and $K_2O$, independently of each other, are present in an amount of 0 to 20 or 0 to 10% by weight, but a minimum amount of 0.1 or 0.2 or especially 0.5% by weight is preferred. The maximum amount of the individual alkali oxides is preferably a maximum of 8% by weight, but respective amounts of 0.2 to 1% by weight for $Li_2O$, of 0.2 to 1.5% by weight for $Na_2O$ and of 6-8 for $K_2O$ are preferred. The sum total of the alkali oxides in the base glass according to the invention amounts to 0-25% by weight and especially 0.5 to 5% by weight. Alkaline earth oxides, such as Mg, Ca and Sr oxides, are contained in the base glass in respective amounts of 0 to 20% by weight and especially in an amount of 0 to 8 or 0 to 5% by weight. The sum total of the alkaline earth oxides amounts to from 0 to 20% by weight, preferably from 0 to 10% by weight. In a particularly preferred embodiment the minimum total amount of alkaline earth oxides present in the base glass amounts to at least 0.5% by weight or greater than 1% by weight.

Furthermore the base glass according to the invention preferably contains 0-3% by weight ZnO; 0-3 or 0-5% by weight $ZrO_2$; 0-1 or 0-0.5% by weight $CeO_2$; and 0-1% by weight or 0-5% by weight $Fe_2O_3$. Moreover each of $WO_3$, $Bi_2O_3$ and $MoO_3$ can be contained in the glass according to the invention, independently of each other, in an amount of 0-5 or 0-3% by weight, but especially of 0.1-3% by weight.

It has been shown that, although the glass according to the invention is very stable against solarization by UV radiation, its solarization stability can be further increased by including small amounts of PdO, $PtO_3$, PtO, $RhO_2$, $Rh_2O_3$, $IrO_2$ and/or $Ir_2O_3$. The usual maximum amount of these substances amounts to at most 0.1% by weight, preferably a maximum of 0.01% by weight and especially a maximum of 0.001% by weight. The minimum amount of these ingredients for this purpose is typically 0.01 ppm, but at least 0.05 ppm and especially at least 0.1 ppm is preferred.

Although the glass according to the invention according to the invention can contain small amounts of $CeO_2$, PbO and $Sb_2O_3$ for increasing resistance to chemical attack and processability, the glass according to the invention is preferably free of them. In so far as the glass composition contains iron, the iron is converted to its $3^+$ oxidation state during melting by the oxidizing conditions and no discoloration is caused in the visible wavelength range.

According to the invention it was found that the above-described disadvantages can be at least partially avoided when the glass melt is substantially free of chloride and especially when no chloride and/or $Sb_2O_3$ is added for refining the glass melt. It was found that a blue coloration of the glass, like that occurring especially when $TiO_2$, is used, may be avoided when chloride is not used as the refining agent. The maximum content of chloride and fluoride according to the invention amounts to 2% by weight, especially 1% by weight, but a content of at most 0.1% by weight is especially preferred.

It has been shown surprisingly that sulfates, such as those employed as refining agents, can similarly lead to discoloration of the glass when they are used as the above-mentioned refining agent. Preferably in accordance with the invention the use of sulfate is avoided. The maximum content of sulfate according to the invention amounts to 2% by weight, especially 1% by weight, but a content of at most 0.1% by weight is especially preferred.

According to the invention these above-described disadvantages may be further avoided when refining is performed with $As_2O_3$ and of course under oxidizing conditions and when $TiO_2$ is added for adjusting the UV cutoff. According to the invention it has been shown that the above-described disadvantages may be avoided when at least 80%, generally at least 90%, preferably at least 95% and especially 99% of the $TiO_2$ is present as $Ti^{+4}$. In many cases 99.9 and 99.99% of the titanium is present as $Ti^{+4}$. In individual cases a titanium content of 99.999% $Ti^{+4}$ has proven to be significant. Under oxidizing conditions it is to be understood that $Ti^{+4}$ is present in the above-stated amounts or is oxidized to this oxidation state. These oxidative conditions may be easily attained in the melt according to the invention, for example, by addition of nitrates, such as alkali nitrates and/or alkaline earth nitrates and zinc nitrate, as needed. An oxidizing melt can also be produced by blowing oxygen and/or dry air through it. Furthermore it is possible to produce an oxidative melt in the method according to the invention by means of an oxidizing burner adjustment, for example during melting of crude ware or blanks.

The procedure according to the invention has proven suitable for avoiding color-forming faults and defects in the glass matrix, some of which are formed by solarization, which are at least greatly reduced.

The process according to the invention and/or the glass is made by preparing a melt from conventional starting materials, in which alkali oxides, such as Na, K and Li oxides, are added as the suitable carbonates and preferably as nitrates. The use of halides and sulfates is preferably avoided in the process according to the invention. During oxidative refining by means of $As_2O_3$ however minimal traces of sulfate in the melt or in the raw material for it can be present as long as they do not exceed 0.2 Mol % and especially 0.1 Mol %. The glass is refined from crude products that are melted in a known way and preferably by using $As_2O_3$. The process according to the invention is preferably performed without $Sb_2O_3$ as refining agent and is preferably free of it. The content of alkali and/or alkaline earth oxides added as nitrates amounts to at most 8% by weight, preferably 6% by weight and especially at most 2% by weight. However the minimum amount usually amounts to at least 0.1% by weight, although 0.5% by weight is especially preferable. The nitrates themselves are preferably used in the process according to the invention in amounts of at least 0.3 Mol %, preferably 1 Mol %, wherein a customary maximum amount is 6 Mol % and especially a maximum amount of 5 Mol %.

The refining agent $As_2O_3$ is used in a process according to the invention in an amount of at least 0.01% by weight, preferably at least 0.05% by weight and especially at least 0.1% by weight. The customary maximum amount is 2% by weight, especially 1.5% by weight, wherein a maximum amount of 1% by weight, especially of 0.8% by weight, is preferred.

The $TiO_2$ content, by which the size and/or sharpness and position of the UV-absorption cutoff is adjustable, preferably amounts to at least 0.05% by weight, typically at least 0.01% by weight, wherein at least 0.5% by weight is especially preferred. In most cases a minimum amount of 1% by weight and/or 2% by weight has proven suitable for UV blocking up to at least 260 nm (layer thickness 0.2 mm). Amounts of at least 4% by weight, preferably at least 4.5% by weight, have proven to be sufficient to obtain blocking up to 310 nm (layer thickness of 0.2 mm). The customary highest amount for this wavelength range amounts to 6% by weight, preferably 5.5% by weight $TiO_2$. The maximum amount of $TiO_2$ according to the invention amounts to a 12% by weight, customarily 10% by weight and most preferably 8% by weight.

According to the invention it was found that the UV transmission cutoff can be adjusted by means of $Fe_2O_3$ in a synergistic way. Although it is known that $Fe_2O_3$ leads to a discoloration of the base glass in the visible range and thus to undesired absorption at visible wavelengths, it was found that the glass according to the invention was not discolored in the visible range or at most in a manner that does not interfere, when, as described above, the glass is refined under oxidative conditions. Iron present in the glass is converted into its +3 oxidation state or a reduction from this state is prevented because of the oxidative conditions during the melting and/or refining. In this way it is now possible according to the invention to limit the content of $TiO_2$ in the glass. It has been shown that especially the $TiO_2$ dissolved in the base matrix separates into two phases, especially with higher $TiO_2$ amounts, with slow cooling and/or with re-heating, e.g. during further processing, which leads to a Tyndall effect, which scatters transmitted light. This can be avoided now according to the invention by addition of $Fe_2O_3$ to the base glass under oxidative conditions and the inherent reduction of $TiO_2$ because of that. The amount of $Fe_2O_3$ used preferably amounts to at least 50 ppm, especially at least 100 ppm, but amounts of 120 and/or 140 ppm are preferred. Customary minimum amounts of 150 ppm and especially 200 ppm are preferred. The upper limit of $Fe_2O_3$ content is determined by desired adjustment of the UV transmission cutoff and thus the UV absorption behavior. However an upper limit of at most 1500 pp and especially of 1200 ppm has proven to be suitable, but an upper limit of 1000 ppm is especially suitable. Upper limits of 800 ppm and especially 500 ppm have proven to be especially suitable. In many cases a maximum content of 400 ppm is sufficient. According to the invention it has been shown that the UV cutoff is shifted about 3 ot 6 nm to higher wavelengths by addition of about 100 ppm of $Fe_2O_3$.

In the case, in which $Fe_2O_3$ is present, it has been shown that a minimum amount of $TiO_2$ of 0.5% by weight and especially of 0.7% by weight and/or 0./8% by weight are sufficient for the UV absorption behavior. The upper limit amounts to 4.5% by weight, especially 4% by weight, in the presence of $Fe_2O_3$, but an upper limit of 3.5% is especially preferred. However in many cases an upper limit of 3% by weight, especially 2.8% by weight and even 2.5% by weight has proven to be completely sufficient.

Although nitrates are added to the glass in the melt, preferably in the form of alkali and/or alkaline earth nitrates, the $NO_3$ concentration in the finished glass after refining amounts to only at most 0.01% by weight and in many cases 0.001% by weight at the highest.

According to a preferred embodiment of the invention the glass has the following composition, in percent by weight based on oxide content:

| | |
|---|---|
| $SiO_2$ | 60-<75 |
| $B_2O_3$ | >25-35 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-3 |
| $ZrO_2$ | 0-5 |

-continued

| | |
|---|---|
| TiO$_2$ | 0-10 |
| Fe$_2$O$_3$ | 0-0.5 |
| CeO$_2$ | 0-0.5 |
| MnO$_2$ | 0-1.0 |
| Nd$_2$O$_3$ | 0-1.0 |
| WO$_3$ | 0-2 |
| Bi$_2$O$_3$ | 0-5 |
| MoO$_3$ | 0-5 |
| As$_2$O$_3$ | 0-1 |
| Sb$_2$O$_3$ | 0-1 |
| SO$_4^{2-}$ | 0-2 |
| Cl$^-$ | 0-2 |
| F$^-$ | 0-2; | wherein a sum total amount of Li$_2$O+Na$_2$O+K$_2$O is 0 to 25% by weight; a sum total amount of MgO+CaO+SrO+BaO is 0 to 20% by weight; a sum total amount of Fe$_2$O$_3$+CeO$_2$+TiO$_2$+PbO+As$_2$O$_3$+Sb$_2$O$_3$ is at least 0 to 10% by weight; and a sum total amount of PdO+PtO$_3$+PtO$_2$+PtO+RhO$_2$+Rh$_2$O$_3$+IrO$_2$+Ir$_2$O$_3$ is from 0.00001-0.1% by weight.

According to a preferred embodiment of the invention the glass has the following composition, in percent by weight based on oxide content:

| | |
|---|---|
| SiO$_2$ | 63-72 |
| B$_2$O$_3$ | >25-35 |
| Al$_2$O$_3$ | 0-3 |
| Li$_2$O | 0-5 |
| Na$_2$O | 0-5 |
| K$_2$O | 0-5 |
| MgO | 0-3 |
| CaO | 0-5 |
| SrO | 0-3 |
| BaO | 0-3 |
| ZnO | 0-3 |
| ZrO$_2$ | 0-5 |
| TiO$_2$ | 0-10 |
| Fe$_2$O$_3$ | 0-0.5 |
| CeO$_2$ | 0-0.5 |
| MnO$_2$ | 0-1.0 |
| Nd$_2$O$_3$ | 0-1.0 |
| WO$_3$ | 0-2 |
| Bi$_2$O$_3$ | 0-5 |
| MoO$_3$ | 0-5 |
| As$_2$O$_3$ | 0-1 |
| Sb$_2$O$_3$ | 0-1 |
| SO$_4^{2-}$ | 0-2 |
| Cl$^-$ | 0-2 |
| F$^-$ | 0-2; | wherein a sum total amount of Li$_2$O+Na$_2$O+K$_2$O is 0.5 to 5% by weight; a sum total amount of MgO+CaO+SrO+BaO is 0 to 5% by weight and a sum total amount of Fe$_2$O$_3$+CeO$_2$+TiO$_2$+PbO+As$_2$O$_3$+Sb$_2$O$_3$ is from 0 to 10% by weight.

All the foregoing glass compositions preferably contain the above-described amounts of Fe$_2$O$_3$ and are preferably entirely free of FeO.

The invention also concerns a process for making a UV absorbing glass with reduced absorption in the visible range. A melt is made from raw materials and/or waste glass, which have the composition defined in the claims. The process according to the invention is characterized by the fact that no high purity starting materials are required, especially no high purity SiO$_2$ starting material. Instead the SiO$_2$ starting material can have a content of Fe$_2$O$_3$ of >100 ppm and/or >500 ppm, especially 600 ppm. Mostly the starting material has a content of >120 ppm and/or >130 ppm, however a content of $\geq$150 ppm or even 200 ppm can be used in the process according to the invention. In many cases an SiO$_2$ starting material with an iron content of >800 ppm, especially of >1000 ppm up to >12000 ppm has proven to be suitable. Since iron-free base material leads to increased costs in glass manufacture, thus the procedure according to the invention not only has surprisingly technical benefits, but facilitates a substantially more economical manufacture.

It has been shown that an especially sharp UV cutoff can be adjusted by means of the process according to the invention and in the glass according to the invention, so that UV blocking up to 260 nm, especially up to 270 nm and particularly up to 300 nm, can be attained without difficulties. In an especially preferred embodiment the glass according to the invention blocks UV radiation up to 320 nm and especially up to 335 nm. It is possible to provide a UV cutoff without or with minimal impairment of the visible wavelength range by addition of TiO$_2$ by means of the refining with As$_2$O$_3$ and TiO$_2$.

The glass composition according to the invention is especially suitable for flat glass, especially made by the float process, but the use of the glass composition for glass tubing is especially preferred. The glass compositions according to the invention are especially suitable for making tubing with a diameter of at least 0.5 mm, especially at least 1 mm, and with an upper limit of at most 2 cm, especially at most 1 cm. Tubing diameters between 2 mm and 5 mm are especially preferred. It has proven suitable when the tubing has a wall thickness of at least 0.05 mm, especially at least 0.1 mm, but at least 0.2 mm is especially preferred. Maximum wall thicknesses amount to at most 1 mm, but wall thicknesses of at most <0.8 mm and/or 0.7 mm are preferred.

The glass according to the invention is especially suitable for use in glass discharge tubes, such as fluorescent lights, especially miniaturized fluorescent lights and is especially suitable for lighting, especially for background lighting of electronic display devices, such as displays and LCD screens, for example in mobile telephones and computer monitors. Preferred displays and imaging devices are so-called flat screen displays, especially surface backlighting devices. Halogen-free lighting devices, for example those based on gas discharges including xenon atoms (Xenon lamps), are especially preferred. These apparatuses have proven to be especially environmentally friendly.

The glass according to the invention preferably has reduced dielectric properties. The dielectric constant at 1 MHz at 25° C. amounts to a maximum value of 12 and preferably is under 10, but values under 7 and especially under 5 are especially preferred. The dielectric loss factor tan σ[10$^{-4}$] amounts to at most 120 and preferably less than 100. Loss factors under 80 are especially preferred. However values under 50 and under 30 are specially suitable. Values of the dielectric loss factor under 15 are particularly preferred.

Silica or quartz glass comprises pure SiO$_2$ and has a dielectric constant DZ of about 4. The disadvantage of this glass is that it is very difficult to process or work. The glasses according to the invention have definitely improved processing temperatures and can be processed by conventional methods. The temperature at which the viscosity is 10$^4$ dPas is designated as the processing temperature. Preferred processing temperatures (VA) are less than 1350° C., preferably less than 1300° C., but a processing temperature of 1200° C. is particularly preferred. However a processing temperature VA of less than 1100° C. is especially preferred.

The glasses according to the invention are especially adapted for use in fluorescent lamps with external electrodes and also in fluorescent lamps in which electrodes pass through and are sealed with the lamp glass, for example KOVAR® alloys, molybdenum and tungsten. The external electrodes can be formed by an electrically conductive paste, for example.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1A:
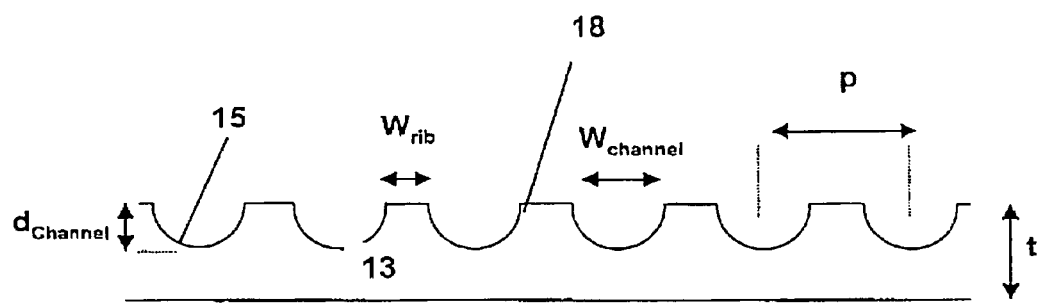
FIG. 1a is diagrammatic cross-sectional view of a reflecting base and/or support and substrate plate for a miniaturized backlight arrangement, which is shown in FIG. 1b.
Figure 1B:
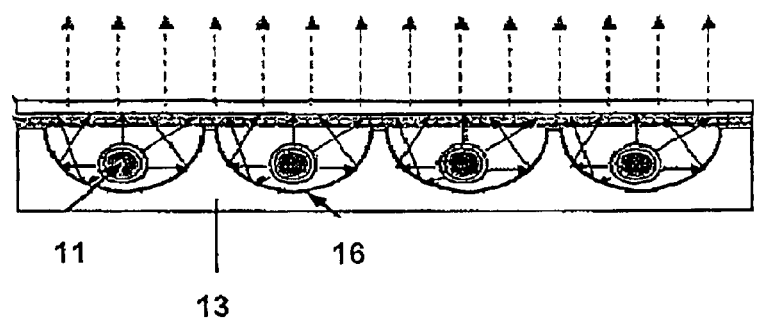
FIG. 1b is a schematic cross-sectional view through a miniaturized backlight arrangement.

In a special arrangement according to FIG. 1 the glass is used to make low pressure discharge lamps, especially for a backlight arrangement. A special use is for those applications, in which individual miniaturized illuminating tubes 11 are arranged parallel to each other and in a plate 13 provided with depressions or troughs 15, which reflect the issuing light on the display. A reflecting layer 16 is applied on the reflecting plate 13, which uniformly scatters the light and thus provides for a uniform illumination of the display. This arrangement is preferred for larger displays used, e.g. in a television.

Figure 2:
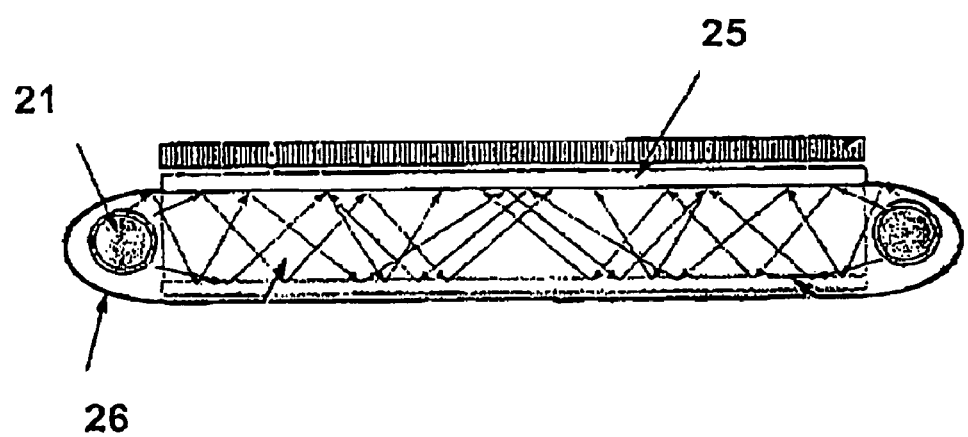
FIG. 2 is a cross-sectional view through a backlight arrangement with external electrodes.
Figure 3:
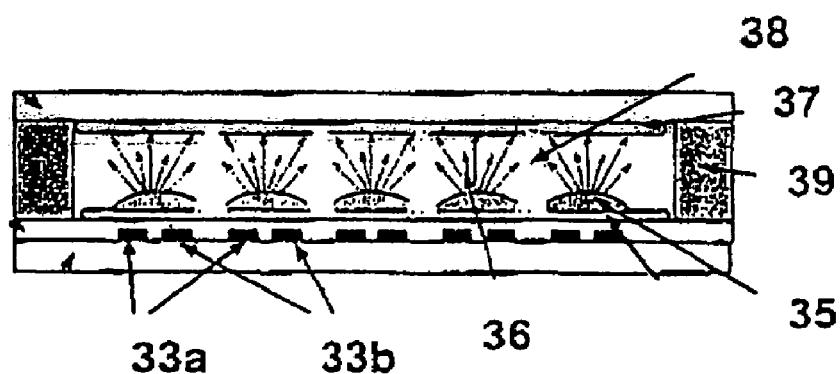
FIG. 3 is a display arrangement with laterally mounted fluorescent lights.

As shown in the embodiment of FIG. 2, the illuminating tubes 21 can also be mounted outside the display. Then the light is uniformly scattered uniformly over the display by means of a conveying plate 25 serving as a light guide, a so-called LGP (light guide plate). In both cases the illuminating tube can have external or internal electrodes.

Furthermore it is also possible to use it for this sort of backlight arrangement in which the light-producing unit 31 is arranged in a structured plate 13. The structuring is such that channels with a predetermined depth and a predetermined width ($d_{channel}$ or $w_{channel}$) are produced by means of parallel elevated portions, the so-called barriers 38, in which the discharge light sources 35 are located. The channels together with the plate provided with a phosphor layer 37 form the radiating chamber 36. The plates themselves are sealed laterally 39 and provided with electrodes through through-going guides. One embodiment is a so-called CCFL system (cold cathode fluorescent lamp). However an outside contact, i.e. ignition of the plasma by an outer electric field, is possible (EEFL external electrode fluorescent lamp). The field is provided by outer electrodes 33a, 33b. This arrangement forms a large flat backlight and is also called a flat backlight. The application of the glass according to the invention concerns the structured plate of the flat backlight and/or the cover plate. Both together form the radiating chamber.

To make this sort of structured plate a blank, which is obtained by rolling, is pressed by means of a conventional structuring unit, for example a suitable structuring roll. Moreover the glass is heated to a temperature, at which it has a viscosity that is suitable for that purpose, which is a temperature between the processing temperature and the softening temperature. The structured plate has the structures with depths and widths in the dimensions of several centimeters (e.g. 0.1, usually 0.3 mm) to a few millimeters (e.g. 1 to 8 mm). This sort of structuring can also occur by other manufacturing methods, such as embossing or stamping, carving or engraving, milling, chemical etching or laser ablation. The desired structure can also be obtained directly from the melt by certain hot molding processes.

The following examples illustrate the above-described invention in more detail, but the details in these examples should not be considered as limiting the claims appended hereinbelow.

EXAMPLES

The examples of the glasses according to the invention were prepared in the known manner and compared with known glasses of the prior art. The raw material was melted in a silica glass vessel and refined. The glass obtained in this manner was tested for its absorption and/or transmission.

The compositions of the individual glass embodiments or examples and their properties are tabulated in the following tables I and II. Table II shows the properties of the three glass compositions tabulated in Table I.

TABLE I

GLASS COMPOSITIONS OF THE INVENTION

| Ingredient | Actual ingredient added to the batch, if different | Example 1 | Example 2 | Example 3 |
|---|---|---|---|---|
| $SiO_2$ | | 69.75 | 68.00 | 65.50 |
| $B_2O_3$ | | 27.10 | 27.10 | 27.10 |
| $Al_2O_3$ | | 0.70 | 0.70 | 1.00 |
| $Li_2O$ | | 0.05 | 0.05 | 0.10 |
| $Na_2O$ | $Na_2O_3/NaNO_3$ | 0.20 | 0.20 | 0.20 |
| $K_2O$ | $K_2CO_3/KNO_3$ | 1.15 | 1.15 | 1.15 |
| MgO | | | | |
| CaO | | | | |
| SrO | | | | |
| BaO | | 0.75 | 0.75 | 0.75 |
| ZnO | | | | |
| PbO | | | | |
| $TiO_2$ | | | 2.00 | 4.00 |
| $ZrO_2$ | | | | |
| $CeO_2$ | | | | |
| $P_2O_5$ | | | | |
| F | | | | |
| Cl | | | | |
| $As_2O_3$ | | 0.3 | 0.1 | 0.1 |
| $Sb_2O_3$ | | | | |
| $Fe_2O_3$ | | | | |
| Sum | | 100.00 | 100.00 | 100.00 |

TABLE II

PROPERTIES OF GLASS COMPOSITIONS ACCORDING TO THE INVENTION

| α (alpha) | $3.50 \times 10^{-6}$/K | | |
|---|---|---|---|
| Tg | 415° C. | | |
| $T_4$ | 1260° C. | | |
| T < 0.1%, D = 0.2 mm, Sample uncooled | | 281 nm | 314 nm |
| T at 700 nm (d = 0.2 mm) | | | |
| Dielectric constant (1 MHz, 25° C.) | 4.3 | | |
| Tan δ × $10^4$ | 10 | | |

The disclosure in German Patent Application DE 10 2004 033 652.0 of Jul. 12, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in UV-radiation-absorbing, especially solarization-stable, borosilicate glass for a gas discharge lamp, and to a process for making it from a refined glass melt and to a glass discharge lamp made with this UV-radiation-absorbing borosilicate glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A process for making a UV-absorbing glass, especially for a fluorescent lamp, said process comprising preparing a glass melt, said glass melt having a composition, in % by weight on an oxide basis of:

| | |
|---|---|
| $SiO_2$ | 60-75 |
| $B_2O_3$ | >25-35 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-3 |
| $ZrO_2$ | 0-5 |
| $TiO_2$ | 0-10 |
| $Fe_2O_3$ | 0-0.5 |
| $CeO_2$ | 0-0.5 |
| $MnO_2$ | 0-1 |
| $Nd_2O_3$ | 0-1 |
| $WO_3$ | 0-2 |
| $Bi_2O_3$ | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ or | 0-2 |
| $F^-$ | 0-2; | wherein a sum total amount of $Li_2O+Na_2O+K_2O$ is 0 to 25% by weight; a sum total amount of $MgO+CaO+SrO+BaO$ is 0 to 20% by weight; a sum total amount of $Fe_2O_3+CeO_2+TiO_2+PbO+As_2O_3+Sb_2O_3$ is at least 0 to 10% by weight; and a sum total amount of $PdO+PtO_3+PtO_2+PtO+RhO_2+Rh_2O_3+IrO_2+Ir_2O_3$ is from 0.00001-0.1% by weight.

2. The process as defined in claim 1, wherein said glass melt contains from >26 to 35% by weight of $B_2O_3$.

3. The process as defined in claim 1, wherein said glass melt contains at least 50 ppm of $Fe_2O_3$.

4. The process as defined in claim 1, further comprising using $SiO_2$ and/or crude glass with a content of greater than 100 ppm of $Fe_2O_3$.

5. The process as defined in claim 1, further comprising refining the glass melt under oxidative conditions.

6. The process as defined in claim 5, wherein said oxidative conditions are produced by addition of alkali nitrates, alkaline earth nitrates, $As_2O_3$, $Sb_2O_3$ and/or oxygen.

7. The process as defined in claim 1, further comprising providing a glass batch for making the glass melt containing alkali nitrates and/or alkaline earth nitrates in an amount of up to 6% by weight.

8. The process as defined in claim 1, wherein the glass melt contains up to 100 ppm chloride.

9. A UV-absorbing glass made by a process comprising preparing a glass melt, said glass melt having a composition, in % by weight on an oxide basis of:

| | |
|---|---|
| $SiO_2$ | 60-75 |
| $B_2O_3$ | >25-35 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-3 |
| $ZrO_2$ | 0-5 |
| $TiO_2$ | 0-10 |
| $Fe_2O_3$ | 0-0.5 |
| $CeO_2$ | 0-0.5 |
| $MnO_2$ | 0-1.0 |
| $Nd_2O_3$ | 0-1.0 |
| $WO_3$ | 0-2 |
| $Bi_2O_3$ | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ | 0-2 |
| $F^-$ | 0-2; | wherein a sum total amount of $Li_2O+Na_2O+K_2O$ is 0 to 25% by weight; a sum total amount of $MgO+CaO+SrO+BaO$ is 0 to 20% by weight; a sum total amount of $Fe_2O_3+CeO_2+TiO_2+PbO+As_2O_3+Sb_2O_3$ is at least 0 to 10% by weight; and a sum total amount of $PdO+PtO_3+PtO_2+PtO+RhO_2+Rh_2O_3+IrO_2+Ir_2O_3$ is from 0.00001-0.1% by weight.

10. The glass as defined in claim 9, wherein said glass melt contains from >26 to 35% by weight of $B_2O_3$.

11. The glass as defined in claim 9, wherein said glass melt contains at least 50 ppm of $Fe_2O_3$.

12. The glass as defined in claim 9, wherein said process uses $SiO_2$ and/or a crude glass with a content of greater than 100 ppm of $Fe_2O_3$ to make said glass melt.

13. The glass as defined in claim 9, wherein said process includes refining the glass melt under oxidative conditions.

14. The glass as defined in claim 13, wherein said oxidative conditions are produced by adding alkali nitrates, alkaline earth nitrates, $As_2O_3$ and/or $Sb_2O_3$ and/or oxygen.

15. The glass as defined in claim 9, wherein said process comprises providing a glass batch for making the glass melt and wherein said glass batch contains alkali nitrates and/or alkaline earth nitrates in an amount of up to 6% by weight.

16. The glass as defined in claim 9, wherein the glass melt contains up to 100 ppm chloride.

17. The glass as defined in claim 9, consisting of substrate glass for a backlight display.

18. The glass as defined in claim 9, containing from 0.1 to 10% by weight $TiO_2$ and/or 50-1000 ppm of $Fe_2O_3$.

19. A display device made with the UV-absorbing glass as defined in claim 9, wherein said display device is an LCD display, a computer monitor, a telephone display or a TFT display.

20. A gas discharge lamp made with a UV-absorbing glass, wherein said UV-absorbing glass is made by a process, said process comprising preparing a glass melt, said glass melt having a composition, in % by weight on an oxide basis of:

| | |
|---|---|
| $SiO_2$ | 60-75 |
| $B_2O_3$ | >25-35 |
| $Al_2O_3$ | 0-10 |
| $Li_2O$ | 0-10 |
| $Na_2O$ | 0-20 |
| $K_2O$ | 0-20 |
| MgO | 0-8 |
| CaO | 0-20 |
| SrO | 0-5 |
| BaO | 0-5 |
| ZnO | 0-3 |
| $ZrO_2$ | 0-5 |
| $TiO_2$ | 0-10 |
| $Fe_2O_3$ | 0-0.5 |
| $CeO_2$ | 0-0.5 |
| $MnO_2$ | 0-1 |
| $Nd_2O_3$ | 0-1 |
| $WO_3$ | 0-2 |
| $Bi_2O_3$ | 0-5 |
| $MoO_3$ | 0-5 |
| $As_2O_3$ | 0-1 |
| $Sb_2O_3$ | 0-1 |
| $SO_4^{2-}$ | 0-2 |
| $Cl^-$ | 0-2 |
| $F^-$ | 0-2; | wherein a sum total amount of MgO+CaO+SrO+BaO is 0 to 10% by weight; a sum total amount of $Fe_2O_3$+$CeO_2$+$TiO_2$+PbO+$As_2O_3$+$Sb_2O_3$ is at least 0 to 10% by weight; and a sum total amount of PdO+$PtO_3$+$PtO_2$+PtO+$RhO_2$+$Rh_2O_3$+$IrO_2$+$Ir_2O_3$ is from 0.00001-0.1% by weight.

21. The gas discharge lamp as defined in claim 20, consisting of a fluorescent lamp or an EEFL lamp.

22. The gas discharge lamp as defined in claim 20, wherein said UV-absorbing glass has a dielectric constant of at most 12 and/or a dielectric loss factor tan δ of at most $120 \times 10^{-4}$.

23. The gas discharge lamp as defined in claim 20, wherein said UV-absorbing glass contains from 0.5 to 4.5% by weight $TiO_2$ and/or 50-1000 ppm of $Fe_2O_3$.

24. The gas discharge lamp as defined in claim 20, wherein said process includes refining the glass melt under oxidative conditions produced by adding alkali nitrates, alkaline earth nitrates, $As_2O_3$ and/or $Sb_2O_3$ and/or oxygen.

25. The gas discharge lamp as defined in claim 20, adapted for a display device.

26. The gas discharge lamp as defined in claim 25, wherein the display device is an LCD display, a computer monitor, a telephone display, or a TFT display.

27. The gas discharge lamp as defined in claim 20, contained in a display device.

28. The gas discharge lamp as defined in claim 20, wherein said glass melt contains from >26 to 35% by weight of $B_2O_3$.

* * * * *